United States Patent [19]
Veltman

[11] Patent Number: 5,533,438
[45] Date of Patent: Jul. 9, 1996

[54] SPIRAL TEE FOR TIN FREE STEEL CONTAINERS

[75] Inventor: Joost Veltman, Aptos, Calif.

[73] Assignee: FMC Corporation, Chicago, Ill.

[21] Appl. No.: 454,988

[22] Filed: May 31, 1995

[51] Int. Cl.[6] .................................................. A23L 3/06
[52] U.S. Cl. ................................. 99/360; 99/361; 99/365
[58] Field of Search ........................... 99/359–371, 468, 99/470, 483; 426/407; 422/25, 26, 27, 33, 112, 292, 297, 302, 307–309; 134/65, 132; 165/1, 2, 31

[56] References Cited

U.S. PATENT DOCUMENTS

| | | | |
|---|---|---|---|
| 1,491,093 | 4/1924 | Fooks | 99/361 |
| 1,510,544 | 10/1924 | Chapman | 99/362 |
| 1,754,532 | 4/1930 | Thompson | 99/361 |
| 1,901,083 | 3/1933 | Chapman | 99/365 |
| 2,092,434 | 9/1937 | Thompson | 99/361 |
| 2,536,116 | 1/1951 | Wilbur | 99/370 |
| 3,511,168 | 5/1970 | Pech | 99/360 |
| 5,245,916 | 9/1993 | Elizondo et al. | 99/359 |
| 5,259,301 | 11/1993 | Veltman | 99/365 |
| 5,358,030 | 10/1994 | Veltman et al. | 99/483 |
| 5,472,042 | 12/1995 | Veltman et al. | 99/468 |

*Primary Examiner*—Timothy F. Simone
*Attorney, Agent, or Firm*—Michael B. K. Lee; Douglas W. Rudy

[57] ABSTRACT

The invention provides a rotary processor, which uses T-shaped spiral rails of Nitronic-30 to provide wear resistant rails for processing tin free steel containers.

3 Claims, 2 Drawing Sheets

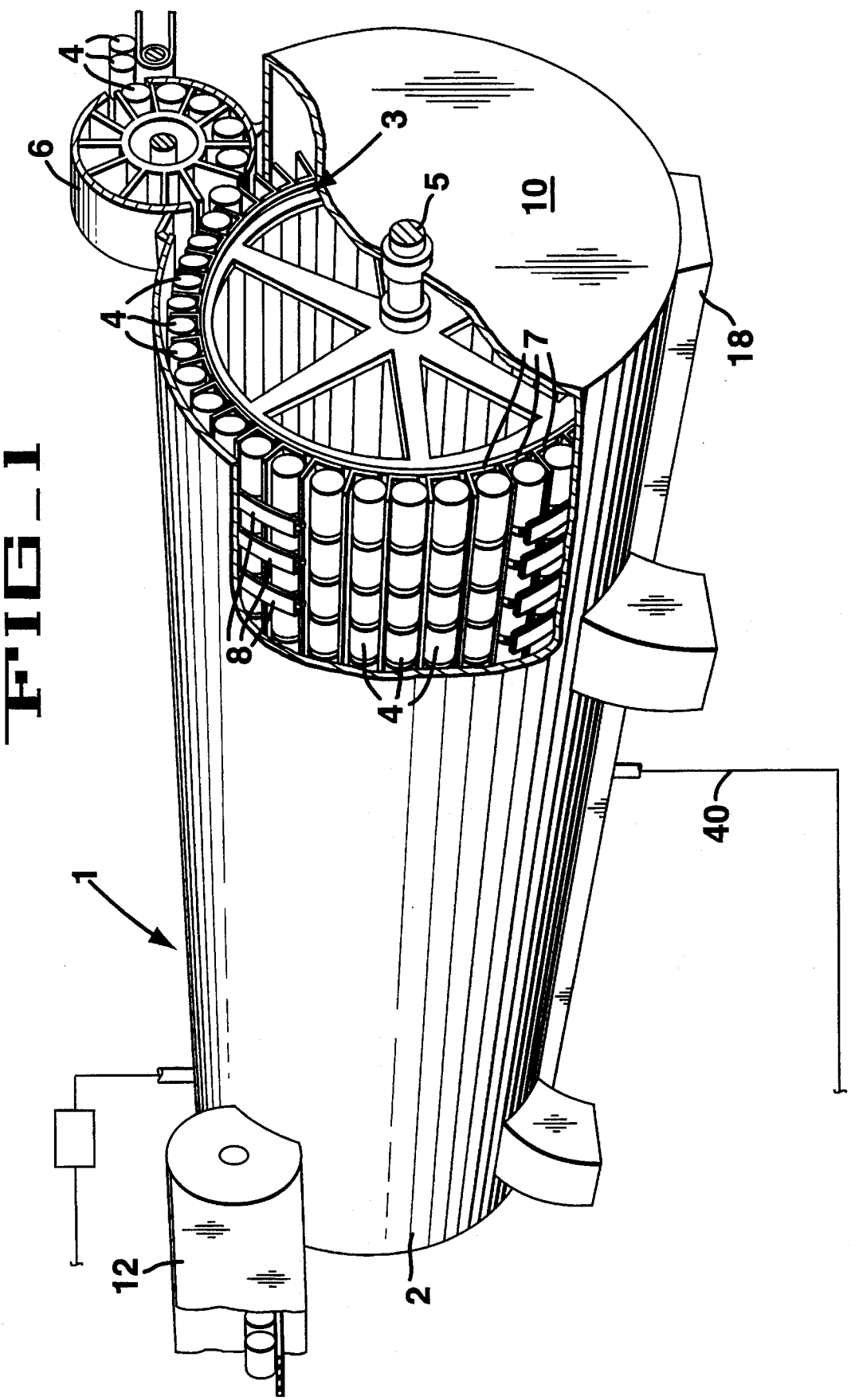

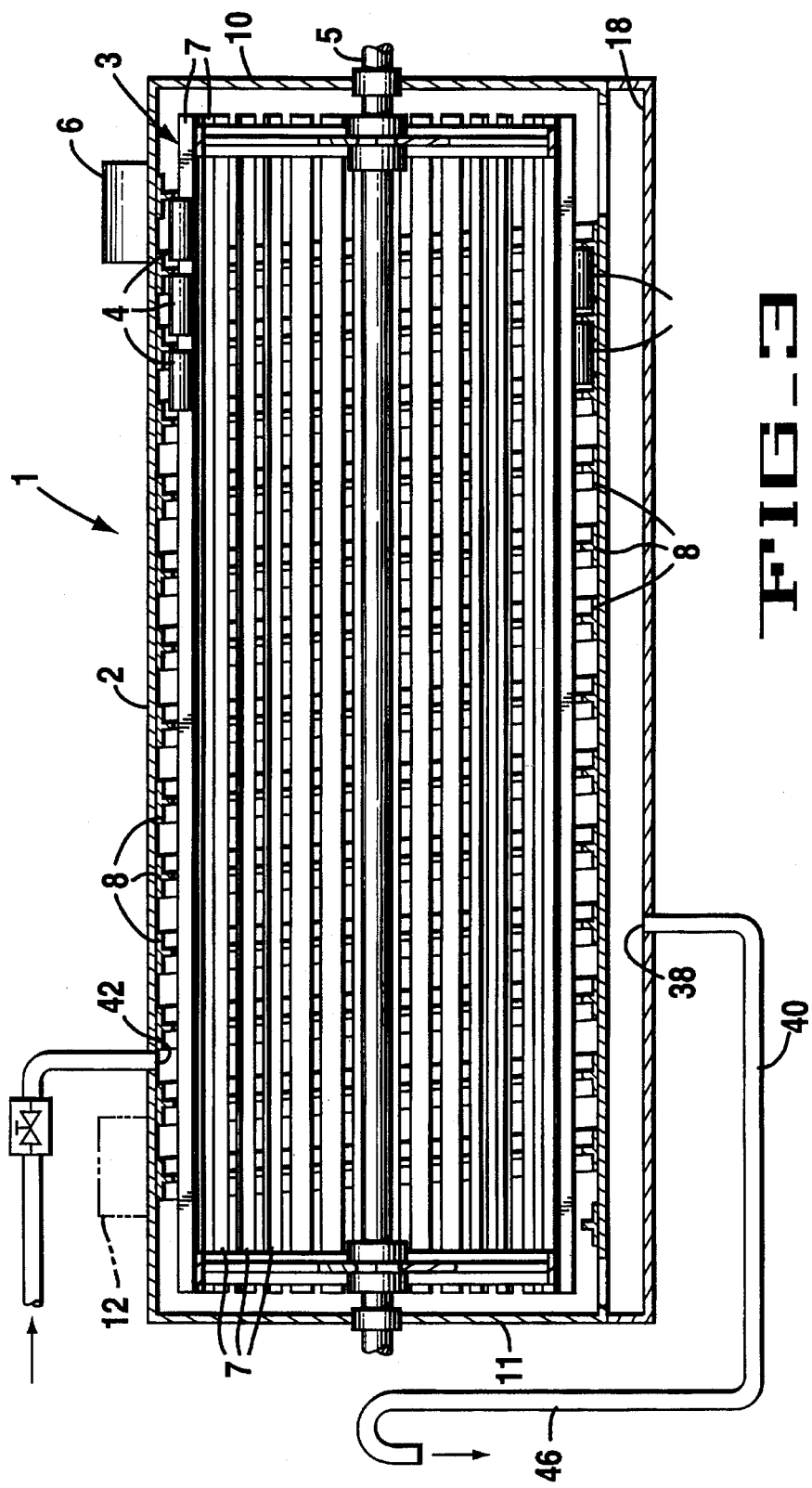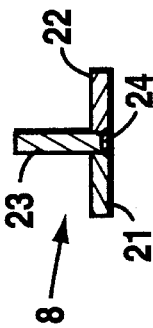

SPIRAL TEE FOR TIN FREE STEEL CONTAINERS

In continuous, rotary pressure sterilizers for containerized foods, at least one vessel (or shell) is used for heating or cooling filled containers.

With the use of tin free steel containers in a continuous, rotary pressure sterilizer the tin free steel causes sever damage and wear to the prior art T-shaped rails inside the continuous rotary pressure sterilizer.

It is an object of the invention to provide a rotary sterilizer with a T-shaped rail which has reduced wear when used with tin free steel containers.

The invention uses three separate strips of an alloy merge welded to provide a T-shaped rail for a continuous rotary pressure sterilizer.

FIG. 1 is a perspective view with parts cut away of a single vessel used for heating or cooling.

FIG. 2 is a cross sectional view of the vessel in FIG. 1 along lines 2—2.

FIG. 3 is an enlarged cross sectional view of a T-shaped rail.

FIG. 1 is a perspective view of a single vessel with FIG. 2 being a cross sectional view of the vessel in FIG. 1 along lines 2—2. The single vessel of the continuos rotary pressure sterilizer includes a cylindrical housing 2 having a rotatable reel 3 therein, which rotates around an axle 5 which is journaled in a first end plate 10 and a second end plate 11 that are secured to the housing 2 in pressure tight engagement. The cylindrical housing 2 and the end plates 10, 11 form the single vessel 1. On a first end of the vessel 1 in the region of the first end plate 10 is a feed device 6. On a second side of the vessel 1 in the region of the second end plate 11 is a discharge device 12. A plurality of angle bars 7 extend the length of the reel 3 parallel to the axis of rotation of the reel 3 on the outer circumference of the reel 3. A T-shaped rail 8 forms a spiral on the inside of the housing 2. At the bottom of the vessel 1 is a trough 18.

A condensate drain 38 is located in the trough 18. The condensate drain 38 is connected to a condensate drain tube 40, which is connected to a condensate removal control device. A steam inlet 42 is located in the vessel 1, and is connected to a steam inlet tube in which a steam inlet control valve is located.

FIG. 3 is an enlarged view of a cross section of a T-shaped rail 8 shown in FIG. 2. The T-shaped rail 8 comprises a first base rail 21, a second base rail 22, and a vertical strip 23. The first base rail 21, the second base rail 22, and the vertical strip 23 are mechanically connected together by a merge weld 24. The vertical strip 23 is placed perpendicular to the first base rail 21 and the second base rail 22 as shown in FIG. 3. The first base rail 21 and the second base rail 22 are formed the material Nitronic-30, which is a wear resistant and shearable stainless alloy The vertical strip 23 may also be formed from Nitronic-30 or some other wear resistant and shearable material.

In operation of the above embodiment an individual can is provided to the feed device 6, which provides the can to the rotatable reel 3 in the vessel 1. An angle iron 7 on the rotatable reel 3 pushes the can 4 around the rotatable reel 3 in a counter clockwise direction as indicated by the arrow. As the can 4 rotates around the rotatable reel 3, the T-shaped spiral rail 8 pushes the can from near to first end plate 10 towards the second end plate 11. The can is removed from the vessel 1 by a discharge device 12.

Some cans are made of tin free steel. The Nitronic-30 prevents resist the wear that such tin free steel cans caused to prior art spiral T-shaped rails. Nitronic-30 provides a material that may be easily formed into a spiral rail, and yet resists wear from tin free steel containers. Nitronic-30 is a nitrogen strengthened high manganese alloy stainless steel manufactured by Armco. Nitronic-30 has a good aqueous corrosion resistance and the needed abrasion resistance under mild corrosive conditions. Nitronic-30 undergoes transformation due to cold working into a martensic micro structure which provides the desired increase against abrasive wear required for rolling and sliding contact with the tin free steel coated containers. Of several other metals tested and reviewed for wear resistance and manufacturing procedures for fabrication of spiral T's, Nitronic-30 was found to meet the necessary criteria for processing tin free steel containers.

While preferred embodiment of the present invention has been shown and described herein, it will be appreciated that various changes and modifications may be made therein without departing from the spirit of the invention as defined by the scope of the appended claims.
ML:step

What is claimed is:

1. An apparatus for processing filled containers, comprising:

a vessel with a central cavity with a first end and a second end and a top and a bottom;

an axle with a length extending from the first end of the central cavity to the second end of the central cavity;

a reel connected to and extending along the length of the axle wherein the reel has an outer edges, which are parts of the reel displaced furthest from the axle, wherein the outer edges of the reel are able to rotate around the axle within the central cavity;

means connected to the outer edges of the reel and extending along the length of the reel for pushing the containers around the reel as the reel is rotated; and a spiral piece on the inside of the central cavity around the reel, comprising:

a first base rail formed from the material Nitronic-30; and a vertical rail perpendicular to the first base rail and mechanically connected to the first base rail.

2. The apparatus, as recited in claim 1, wherein the spiral piece further comprises a second base rail formed from the material Nitronic-30, mechanically connected to the vertical rail.

3. The apparatus, as recited in claim 2, wherein a merge weld provides the mechanical connection between the vertical rail and the first base rail and the second base rail.
ML:step

* * * * *